(12) United States Patent
Kunimatsu et al.

(10) Patent No.: US 6,185,162 B1
(45) Date of Patent: Feb. 6, 2001

(54) METHOD FOR ADJUSTING MAGNETIC AND OPTICAL HEADS IN MAGNETO-OPTICAL RECORDING DEVICE

(75) Inventors: Yasukiyo Kunimatsu; Kazuhito Yokoyama, both of Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 09/281,952

(22) Filed: Mar. 31, 1999

(30) Foreign Application Priority Data

Aug. 20, 1998 (JP) .................................................. 10-234699

(51) Int. Cl.$^7$ .................................................. G11B 11/00
(52) U.S. Cl. .................................................. 369/13
(58) Field of Search ................ 369/13, 14, 110, 369/116; 300/114, 59

(56) References Cited

U.S. PATENT DOCUMENTS

| | | | |
|---|---|---|---|
| 5,193,080 | * 3/1993 | Mohri et al. | 369/244 |
| 5,305,294 | * 4/1994 | Kime et al. | 369/13 |
| 5,367,508 | * 11/1994 | Haba | 369/13 |
| 5,434,831 | * 7/1995 | Ishii et al. | 369/13 |
| 5,446,678 | * 8/1995 | Saltzstein et al. | 709/246 |
| 5,627,804 | * 5/1997 | Ishii | 369/13 |
| 5,636,187 | * 6/1997 | Fujii | 369/13 |

FOREIGN PATENT DOCUMENTS

| | | | |
|---|---|---|---|
| 2-223047 | * 9/1990 | (JP) | 369/13 |
| 5-47061 | * 2/1993 | (JP) | 369/13 |
| 5-168615 | * 5/1993 | (JP) | 369/13 |
| 652589 | 2/1994 | (JP) . | |
| 6-150421 | * 5/1994 | (JP) | 369/13 |
| 6-176369 | * 6/1994 | (JP) | 369/13 |
| 6243402 | 9/1994 | (JP) . | |
| 7-182715 | * 7/1995 | (JP) | 369/13 |
| 8-7379 | * 1/1996 | (JP) | 369/13 |

* cited by examiner

*Primary Examiner*—Tan Dinh
(74) *Attorney, Agent, or Firm*—Greer, Burns & Crain, Ltd

(57) ABSTRACT

A magneto-optical memory device includes a first unit projecting a light beam onto a desired position on a recording medium, and a second unit applying a magnetic field to a position onto which the light beam is projected. The second unit applies, to the recording medium, a predetermined magnetic field within a magnetic field intensity range wherein a rate of change of a reproduced signal amplitude at the time of reproduction with respect to a magnetic field intensity becomes large. The relative positions of the second unit and the first unit are adjusted in accordance with a reproduced signal amplitude thus obtained.

17 Claims, 9 Drawing Sheets

METHOD FOR ADJUSTING MAGNETIC AND OPTICAL HEADS IN MAGNETO-OPTICAL RECORDING DEVICE

BACKGROUND OF THE INVENTION

1. Field of the Invention

The present invention relates generally to an adjustment method for a magneto-optical memory device and a magneto-optical memory device, and more particularly to an adjustment method for a magneto-optical memory device and a magneto-optical memory device for storing data using light beams and magnetic fields.

2. Description of the Related Art

Magneto-optical memory devices, such as magneto-optical disk devices, store data by simultaneously focusing or projecting light emitted from a light source through an objective lens onto a recording surface of a magneto-optical disk comprising the recording medium and applying an external magnetic field to the position on the disk onto which the light beam is projected or focused. An overwrite system, involving magnetic field modulation recording using a magnetic head capable of reduced magnetic field switching time, has been proposed as one method of reducing the data storage time.

As the recording density of the above-described magneto-optical disk increases it becomes increasingly necessary to position the light beam and magnetic field accurately so as to reduce data storage time.

FIG. 1 is a diagram showing the structure of an essential part of a conventional magneto-optical disk device. As shown in the diagram, the conventional magneto-optical disk device comprises a light source 2 provided on an optical head 1. Light emitted from the light source 2 is emitted from the optical head 1 and supplied to a reflecting mirror 3.

The reflecting mirror 3 deflects the light supplied from the optical head 1 at an angle of 90°. An objective lens 4 focuses the light supplied from the reflecting mirror 3 on a magneto-optical disk 5.

The objective lens 4 is supported by a lens holder 6. The lens holder 6 is movably supported by an actuator (not shown in the diagram) so as to be movable in a focusing direction (arrow A) and a tracking direction, that is, in a direction of a radius of the magneto-optical disk 5 (arrow B).

A magnetic head 7 is provided on a side opposite the objective lens 4, with the magneto-optical disk 5 positioned between the magnetic head 7 and the objective lens 4. The magnetic head 7 is attached to a suspension arm 8 and the suspension arm is attached to a carriage 9. The carriage 9 is movably supported by an actuator (not shown in the diagram) so as to be movable in the direction of the radius of the magneto-optical disk 5 (arrow B).

It should be noted that, because the magnetic head 7 is fixedly mounted on the carriage 9, the relative positions of the objective lens 4 and the magnetic head 7, that is, the positions of the objective lens 4 and the magnetic head 7 with respect to each other, do not change even when the carriage 9 is moved.

It should also be noted that the carriage 9 is fixed in such a way that a position of a spot 10 on the magneto-optical disk 5 on which the objective lens focuses light and a position of the magnetic head 7 are roughly identical with respect to a hypothetical horizontal plane parallel to the recording surface of the magneto-optical disk 5.

In recent years, the size of the magnetic head 7 has been reduced in order to reduce the switching time of an external magnetic field. As a result, the effective range of the external magnetic field generated by passing an electric current through a coil of a magnetic head element within the magnetic head 7 has been narrowed drastically to approximately 100–200 μm. Given the narrowness of this effective range, even a slight misalignment of the light spot 10 and the magnetic head 7 results in an inability to generate an effective magnetic field for recording and playing back data.

For this reason, then, the positions of the light spot 10 and the magnetic head 7 are adjusted when the magnetic head 7 is mounted on the carriage 9 during manufacture. A description will now be given of one conventional method for adjusting the position of the light spot 10 and magnetic head 7.

FIGS. 2(A) and 2(B) are diagrams of the structure of an essential part of a conventional magneto-optical disk device. FIG. 2(A) is a cross-sectional view of the magnetic head 7 and FIG. 2(B) is a cross-sectional view of the optical system.

As shown in FIG. 2(A), the magnetic head 7 comprises coils 11 and a magnetic pole portion 12. The center magnetic pole 13 of the magnetic pole portion 12 is designed so that a surface of the center magnetic pole 13 opposing the magneto-optical disk 5 has a reflection factor that is greater than that of the adjacent magnetic poles 14 and the surrounding coils 11.

As shown in FIG. 2(B), when adjusting the positions of the light spot 10 and the magnetic head 7 a transparent substrate 15 having the same characteristics as those of a typical magneto-optical disk is positioned between the magnetic head 7 and the objective lens 4. Light emitted from the light source passes through a beam splitter 16 and the objective lens 4 and is trained on the transparent substrate 15. The light so trained on the transparent substrate 15 passes through the transparent substrate 15 and reaches the magnetic head 7. The light that reaches the magnetic head 7 is trained on the magnetic pole portion 12.

The light trained on the magnetic head 7 is reflected by the magnetic head 7 and supplied to the beam splitter 16 via the transparent substrate 15 and the objective lens 4. The beam splitter 16 supplies the light reflected by the magnetic head 7 to a photodetector 17. The photodetector 17 outputs an output signal in response to the amount of light reflected from the magnetic head 7.

It should be noted that a reflecting layer is provided on the center magnetic pole 13 of the magnetic head 7 so that the center magnetic pole 13 has a reflection factor that is greater than that of adjacent members of the magnetic head 7, and so the amount of light reflected is at a maximum amount at a center core 13, that is, a center of the magnetic field generated at the magnetic head 7.

FIGS. 3(A), 3(B) and 3(C) are diagrams for explaining the operation of the conventional position adjustment method, the structure of which has been described above. FIGS. 3(A) and FIG. 3(C) show a state in which the center of the magnetic head 7 and the axis 18 of the light beam 10 do not match, while FIG. 3(B) shows a state in which the center of the magnetic head 7 and the axis 18 of the light beam 10 do match.

FIG. 3(A) shows a state of the center magnetic pole 13 of the magnetic head 7 deviating from the axis 18 of the light beam 10 in the direction of the arrow C1. In this state, the axis 18 of the light beam 10 is trained not on the reflecting layer of the center magnetic pole 13 of the magnetic head 7 but on an adjacent area of the magnetic head 7. As a result, the amount of light reflected decreases and, accordingly, the output of the photodetector 17 also decreases.

Similarly, FIG. 3(C) shows a state of the center magnetic pole 13 of the magnetic head 7 deviating from the axis 18 of the light beam 10 in the direction of the arrow C2. As with the state shown in FIG. 3(a) described above, in this state, too, the axis 18 of the light beam 10 is trained not on the reflecting layer of the center magnetic pole 13 of the magnetic head 7 but on an adjacent area of the magnetic head 7. As a result, the amount of light reflected decreases and, accordingly, the output of the photodetector 17 also decreases.

FIG. 3(B) shows a state in which the magnetic head 7 and the axis 18 of the light beam 10 do match. In this state, the axis 18 of the light beam 10 is aligned with the center magnetic pole 13 of the magnetic head 7 and, thus, the amount of light reflected is at a maximum amount.

FIG. 4 is a diagram showing the relation between the amount of light reflected and the misalignments of the axis 18 of the light beam 10 and the center magnetic pole 13 of the magnetic head 7, in a conventional position adjustment method.

As shown in FIG. 4, when the center magnetic pole 13 of the magnetic head 7 and the axis 18 of the light beam 10 match, the amount of light reflected from the magnetic head 7 attains a maximum value. Accordingly, the output signal of the photodetector 17 attains a maximum value indicated by the solid line shown in FIG. 4.

However, when the axis 18 of the light beam 10 and the center magnetic pole 13 of the magnetic head 7 are in a state of misalignment as described above and as shown in FIGS. 3(A) and FIG. 3(C), then the amount of light reflected from the magnetic head 7 decreases to a level less than that of the maximum value, such lesser level being indicated by the dotted line shown in FIG. 4. Accordingly, the position of the magnetic head 7 is adjusted so that output of the photodetector 17 attains a maximum value.

A description will now be given of another conventional position adjustment method with reference to FIG. 5, which is a diagram for explaining the operation of another conventional position adjustment method. Items identical to those shown in FIG. 2 have been given identical numbers and a description thereof will be omitted for the sake of convenience.

In this position adjustment method, either an actual magneto-optical disk or an equivalent test disk 19 (hereinafter magneto-optical disk 19) is used in play mode to adjust the relative positions of the magnetic head 7 and the objective lens 4. The light reflected from the magneto-optical disk or test equivalent 19 is split by the beam splitter 16 and supplied to a Wollaston polarizing prism 20, where a reproduced signal component is extracted, focused by a focusing lens 21 and supplied to a photodetector 22.

The photodetector 22 obtains from the light supplied from the focusing lens 21 a reproduced signal in response to data previously recorded on the magneto-optical disk 19. The reproduced signal obtained by the photodetector 22 is monitored and the relative positions of the magnetic head 7 and the objective lens 4 are adjusted so that the signal level attains a predetermined level.

FIGS. 6(A), 6(B) and 6(C) are diagrams showing a third conventional position adjustment method. FIGS. 6(A) and 6(C) show states in which the magnetic head 7 and the optical head that focuses the light beam 10 deviate from an optimal position, while FIG. 6(B) shows a state in which the magnetic head 7 and the optical head that focuses the light beam 10 are optimally positioned.

In FIG. 6(A), the magnetic head 7 deviates from the axis 18 of the light beam 10 in the direction of arrow C1, that is, the center of the magnetic field generated at the magnetic head 7 is in a state of deviation from the axis 18 of the light beam 10 in the direction of the arrow C1. In this condition, the axis 18 of the light beam 10 and the center of the magnetic field generated at the magnetic head 7 are misaligned and, as a result, the intensity of the magnetic field decreases at the portion of the light beam 10 focused on the magneto-optical disk 19.

Similarly, in FIG. 6(C) the magnetic head 7 deviates from the axis 18 of the light beam 10 in the direction of arrow C2, that is, the center of the magnetic head 7 deviates from the axis 18 of the light beam 10 in the direction of arrow C2. In this condition, the axis 18 of the light beam 10 deviates from the center of the magnetic head 7 and, as a result, the intensity of the magnetic field operating on the portion of the light beam 10 focused on the magneto-optical disk 19 decreases.

In FIG. 6(B) the center of the magnetic head 7 and the axis 18 of the light beam 10 are in a state of alignment. At this time, the magnetic head 7 and the optical head 7 are optimally positioned.

FIG. 7 is a diagram showing the relation between the amount of light reflected and the misalignments of the axis 18 of the light beam 10 and the center magnetic pole 13 of the magnetic head 7, in a third conventional position adjustment method.

As shown in FIG. 6(B), in a state in which the center of the magnetic head 7 and the axis 18 of the light beam 10 are in alignment, the intensity of the magnetic field applied from the magnetic head 7 to the position at which the light beam 10 is focused on the magneto-optical disk 19 is at a maximum intensity. Accordingly, the resulting reproduced signal reaches a maximum amplitude as shown by the solid line in FIG. 7.

Additionally, as shown in FIGS. 6(A) and FIG. 6(C), when the center of the magnetic field generated at the magnetic head 7 and the axis 18 of the light beam 10 are in a state of misalignment, the intensity of the magnetic field applied from the magnetic head 7 to the position at which the light beam 10 is focused on the magneto-optical disk 19 decreases and, accordingly, the amplitude of the resulting reproduced signal shrinks as shown by the broken line in FIG. 7.

In the third conventional position adjustment method described above, the reproduced signals output as shown in FIG. 7 are detected and the position of the magnetic head 7 adjusted so that the reproduced signal attains a maximum amplitude.

It should be noted, however, that reducing the switching time of the external magnetic field is useful for reducing data recording/reproducing time. It is particularly important to reduce the switching time in the case of the magnetic field modulation recording method. However, reducing the switching time of the external magnetic field, although it can be accomplished with compact magnetic heads, results in a magnetic field of reduced effective range.

The relative positions of the magnetic head 7 and the objective lens 4 are subject to stress, for example minute deformations of the structural members due to heat or fluctuations in the effective range of the external magnetic field, that can change the relative positions of the magnetic head 7 and the objective lens 4 even after the relative positions of the magnetic head 7 and the objective lens 4 have been adjusted and fixed. Accordingly, it is desirable to fix the positions of the light spot and peak strength of the external magnetic field as accurately as possible and to maintain those positions after adjustment and fixing.

However, fine adjustments to the position of peak strength of the magnetic field generated at the magnetic head 7 cannot be made with the conventional position adjustment method shown in FIG. 3.

Similarly, accurate alignment of the light spot and the position of peak strength of the external magnetic field cannot be made with the conventional position adjustment method shown in FIG. 6 because the reproduced signal level attains a level greater than a predetermined level when an external magnetic field is applied so that a magneto-optical signal of a level greater than a certain level is detected at the photodetector 36.

Additionally, when adjusting the positions of the light spot and the magnetic head of the conventional magneto-optical disk apparatus, an external pressure 13 is exerted on a magnetic head fixing portion 37 with respect to a mounting surface of the carriage and, after adjustment, a screw or similar fixing means is used to fixedly mount the magnetic head fixing portion 37 on the mounting surface of the carriage. As a result of this operation, the position of the magnetic head shifts slightly as the screw or similar fixing means is tightened, thus slightly altering the alignment of the magnetic head relative to the light spot.

SUMMARY OF THE INVENTION

Accordingly, it is a general object of the present invention to provide an adjustment method for a magneto-optical memory device and a magneto-optical memory device in which the problems described above are eliminated.

Another and more specific object of the present invention is to provide an adjustment method for a magneto-optical memory device and a magneto-optical memory device capable of accurately aligning the positions of the light spot and the external magnetic field.

The above-described objects of the present invention are achieved by a magneto-optical memory device comprising: a first unit projecting a light beam onto a desired position on a recording medium; and a second unit applying a magnetic field to a position onto which the light beam is projected, the second unit applying, to the recording medium, a predetermined magnetic field within a magnetic field intensity range wherein a rate of change of a reproduced signal amplitude at the time of reproduction with respect to a magnetic field intensity becomes large, relative positions of the second unit and the first unit being adjusted in accordance with a reproduced signal amplitude thus obtained.

The above objects of the present invention are also achieved by a magneto-optical memory device comprising: a first unit projecting a light beam onto a desired position on a recording medium; and a second unit applying a magnetic field to a position onto which the light beam is projected, the second unit applying the magnetic field to the recording medium so that a magnetic field rate of change of the magnetic field generated by the second unit becomes large, the relative positions of the second unit and the first unit being adjusted in accordance with a reproduced signal amplitude thus obtained.

The above objects of the present invention are also achieved by a magneto-optical memory device comprising: a magnetic head for applying a magnetic field to a recording medium; an arm for supporting the magnetic head at one end of the arm; and a supporting portion for supporting a remaining end of the arm, wherein a pressing member for pressing the remaining end of the arm to the supporting portion is fixedly mounted on the supporting portion, the arm being fixedly mounted on the pressing portion after the position of the magnetic head has been adjusted.

The above-mentioned objects of the present invention are also achieved by an adjustment method for a magneto-optical memory device, the adjustment method comprising the steps of: (a) adjusting relative positions of a magnetic field application unit and a light projecting unit; and adjusting a light beam fine adjustment unit so that the center of the magnetic field applied to the recording medium from the magnetic field application unit and the center of the light projected onto the recording medium by the light focusing unit are aligned.

Other objects, features and advantages of the present invention will become more apparent from the following detailed description when read in conjunction with the accompanying drawings.

DESCRIPTION OF THE PREFERRED EMBODIMENTS

A detailed description will now be given of an embodiment of a magneto-optical disk device as the magneto-optical memory device of the present invention, with reference to FIG. 8(A) through FIG. 16. Parts identical to those shown in FIG. 5 and FIGS. 6(A), 6(B) and 6(C) are numbered identically and descriptions thereof are omitted.

Figure 8A:
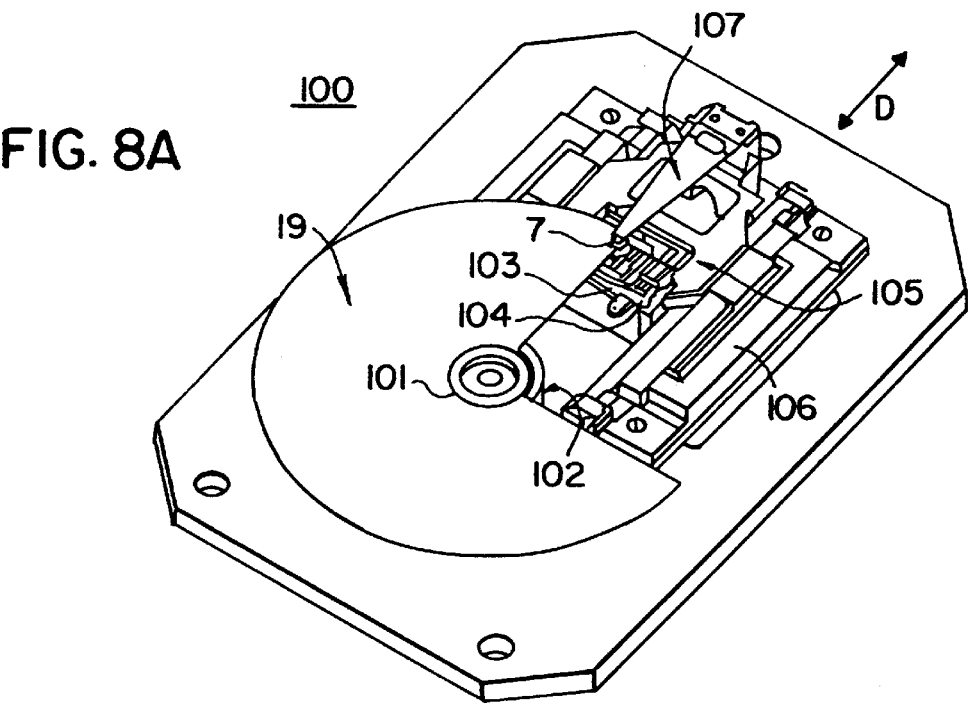
FIGS. 8(A), 8(B) are structural diagrams of one embodiment of the magneto-optical disk apparatus of the present invention.
Figure 8B:
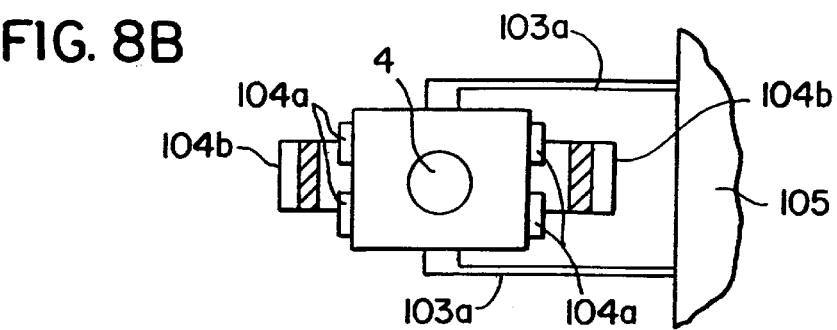

FIGS. 8(A), 8(B) are structural diagrams of one embodiment of the magneto-optical disk device of the present invention. A magneto-optical disk 19 is loaded into the magneto-optical disk device 100. In a state in which the magneto-optical disk 19 is loaded into the magneto-optical disk device 100 as described above, a center hole 101 of the magneto-optical disk 19 is seated upon a spindle motor 102. Additionally, when loaded into the magneto-optical disk device 100 the magneto-optical disk 19 is positioned between a light pick-up 103 and the magnetic head 7 for data reproducing.

The light pick-up 103 has an objective lens 4, a lens holder 6 and an actuator 104. The light pick-up 103 is vibratably supported by a carriage 105 via a wire 103a and focuses a light beam on the magneto-optical disk 19. The lens holder 6 is vibratably supported by the carriage 105, with the lens holder 6 and carriage 105 connected by the actuator 104. The actuator 104 moves the lens holder 6 in a vertical direction to focus and in a horizontal direction to track.

As shown in FIG. 8(B), the actuator 104 comprises a coil 104a fixedly mounted on the lens holder 6 and a magnetic circuit 104b fixedly mounted on the carriage 105. By supplying an electric current to the coil 104a a magnetic effect is exerted on the actuator 104 from the magnetic circuit and the lens holder 6 is moved. The actuator 106 moves the carriage 105 in the direction of a radius of the magneto-optical disk 19 shown as arrow D in FIG. 8.

The magnetic head 7 is supported by the carriage 105 via a suspension arm 107. The magnetic head 7 applies a magnetic field to the portion of the magneto-optical disk 19 on which the light beam emitted from the light pick-up 103 is focused.

In the present embodiment, essentially the adjustment methods shown in FIG. (5), FIG. 6(A), FIG. 6(B), FIG. 6(C) and FIG. 7 are used to align the light spot with the peak intensity of the magnetic field generated at the magnetic head 7. However, it should be noted that, in the present embodiment, a magnetic field intensity less than that normally used for data recording and reproducing is used. As a result, a magnetic field intensity with a good CNR can be used.

Figure 9:
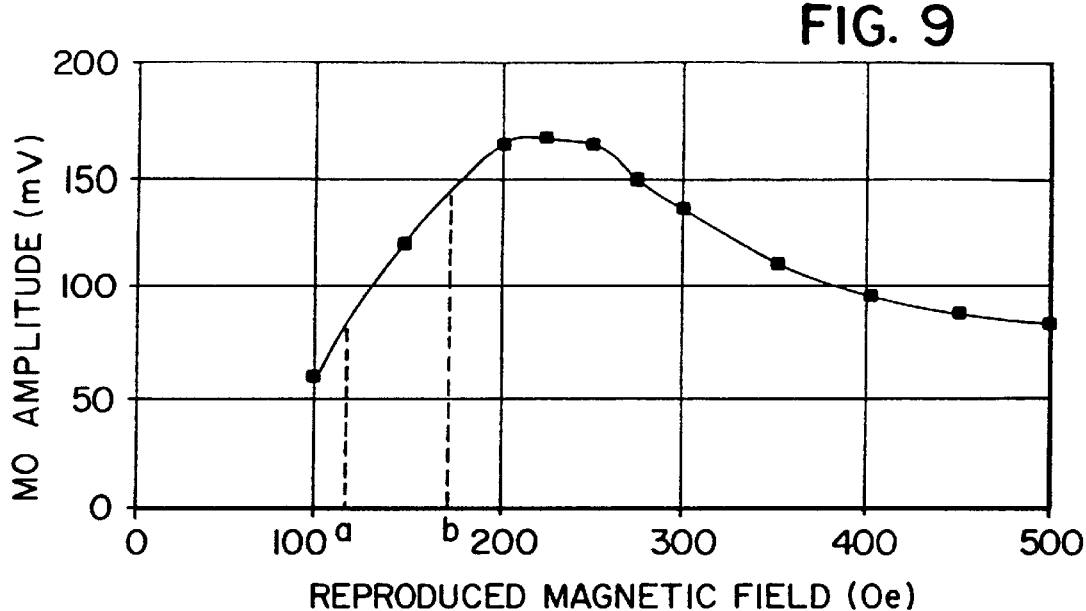
FIG. 9 is a diagram showing the relation between external magnetic field intensity and reproduced signal amplitude.

FIG. 9 is a diagram showing the relation between external magnetic field intensity and reproduced signal amplitude.

With a magneto-optical disk, the reproduced signal amplitude depends on the magnetic field intensity. At an external magnetic field intensity of 200 [Oe] or less applied to the magneto-optical disk 19 from the magnetic head 7 the reproduced signal amplitude increases in accordance with the intensity of the external magnetic field. However, at magnetic field intensities in a range of 200~250 [Oe] the reproduced signal amplitude reaches saturation and at magnetic field intensities greater than 250 [Oe] the reproduced signal amplitude decreases.

Accordingly, when applying an external magnetic field of an intensity of 200~250 [Oe] and adjusting the relative positions of the magnetic head 7 and the objective lens 4, the reproduced signal amplitude reaches saturation near a peak value and it is thus difficult to ascertain clearly the peak of the magnetic field intensity even by monitoring the reproduced signal amplitude closely. It should be noted that the peak value is that part of the magnetic field intensity distribution that occupies the greatest region of the magnetic field intensity distribution.

However, by applying to the magneto-optical disk 19 a magnetic field of an intensity shown as a~b in FIG. 9, that is, a magnetic field intensity of 120~180 [Oe], the rate of change in the reproduced signal amplitude is large. As a result, it is possible to detect easily a maximum value of the reproduced signal amplitude by monitoring the reproduced signal amplitude closely.

Accordingly, in the present embodiment, the electric current supplied to the coil of the magnetic head 7 is set so as to apply a magnetic field of an intensity shown as a~b in FIG. 9, that is, a magnetic field intensity of 120~180 [Oe], to the magneto-optical disk 19 from the magnetic head 7.

Figure 10:
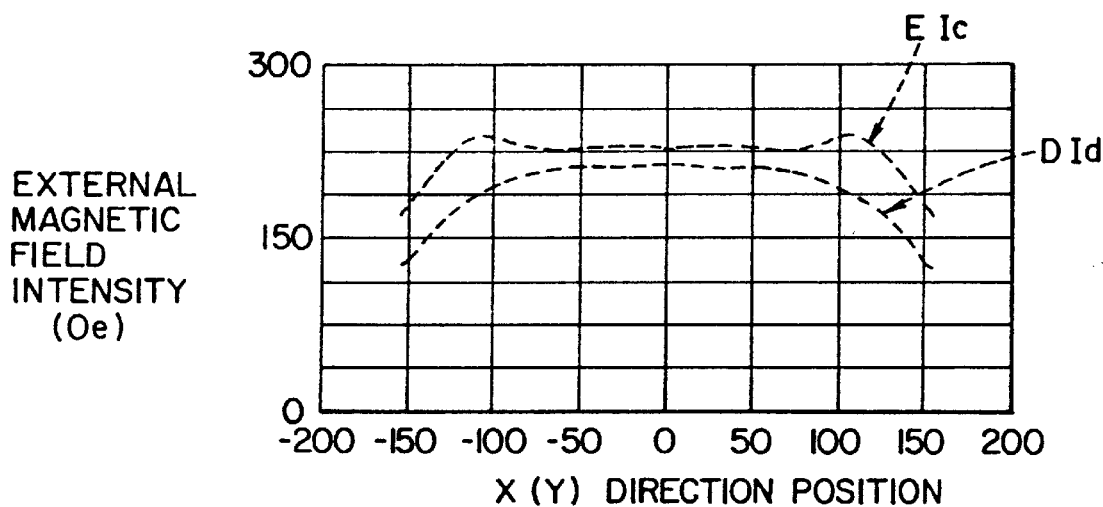
FIG. 10 is a diagram showing the distribution of the external magnetic field intensity in response to the position of the magnetic head.

FIG. 10 is a diagram showing the distribution of the external magnetic field intensity in response to the position of the magnetic head 7. Ic, Id represent values of electric currents supplied to the magnetic head 7, with Ic being greater than Id.

Current Ic is a current value sufficient to obtain a magnetic field intensity required for normal reproduction. As shown in FIG. 10, the distribution of intensity of the magnetic field generated by current Ic in a horizontal X-Y plane parallel to the recording surface of the magneto-optical disk 19 is substantially trapezoidal, with peaks at both edge portions and a slightly concave portion in the center.

Current Id is a current value less than the current value sufficient to obtain a magnetic field intensity required for normal reproduction, that is, less than current Ic. As shown in FIG. 10, the distribution of intensity of the magnetic field generated by current Id in a horizontal X-Y plane parallel to the recording surface of the magneto-optical disk 19 is substantially arc-shaped, with a peak roughly in the center.

By using current Ic to reproduce the data recorded on the magneto-optical disk 19, the distribution of the magnetic field intensity is a distribution having peaks at both edge portions of a trapezoid and, thus, there is a danger that the edge portions of the trapezoid will be mistaken for the center of the magnetic field intensity. However, by using current Id, which is less than current Ic, to reproduce the data recorded on the magneto-optical disk 19, the distribution of the magnetic field intensity assumes an arc shape, with the magnetic field intensity becoming larger in stages toward the center of the distribution. As a result, it is possible to detect a peak value in the center of the magnetic field intensity distribution and thus the center of the magnetic field intensity can be ascertained clearly.

It should be noted that it is possible to change the magnetic field intensity by adjusting the electric current supplied to the magnetic head 7, so that the magnetic field intensity is set to within a range shown as a~b in FIG. 9 and, accordingly, the rate of change in the amplitude of the reproduced signal increases.

Additionally, because the magnetic field intensity is controlled by the distance between the magnetic head 7 and the magneto-optical disk 19, by adjusting said distance the magnetic field intensity may be set to a desired value within the range of magnetic field intensity a~b as shown in FIG. 9 such that the rate of change in the reproduced signal amplitude becomes large.

Figure 1:
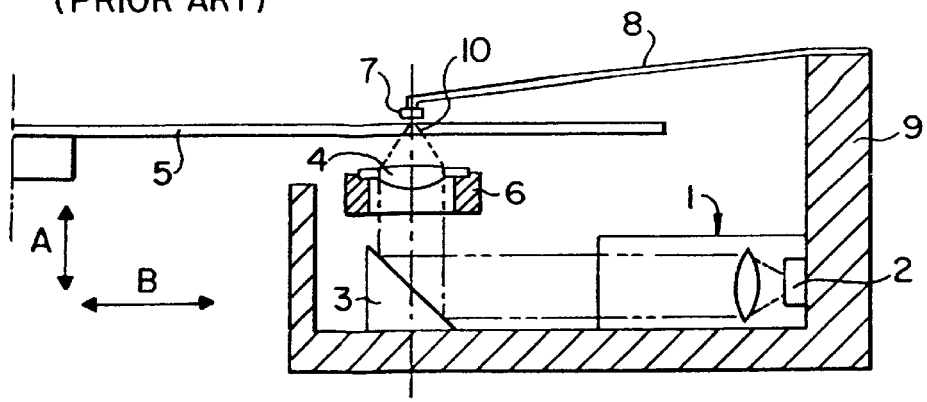
FIG. 1 is a diagram showing the structure of an essential part of a conventional magneto-optical disk device.
Figure 2A:
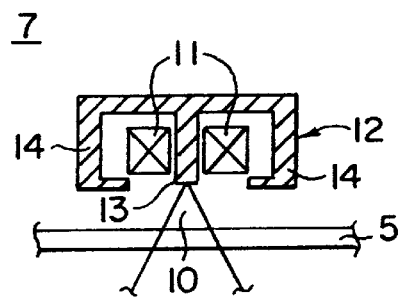
FIGS. 2(A), 2(B) are diagrams of the structure of an essential part of a conventional magneto-optical disk apparatus.
Figure 2B:
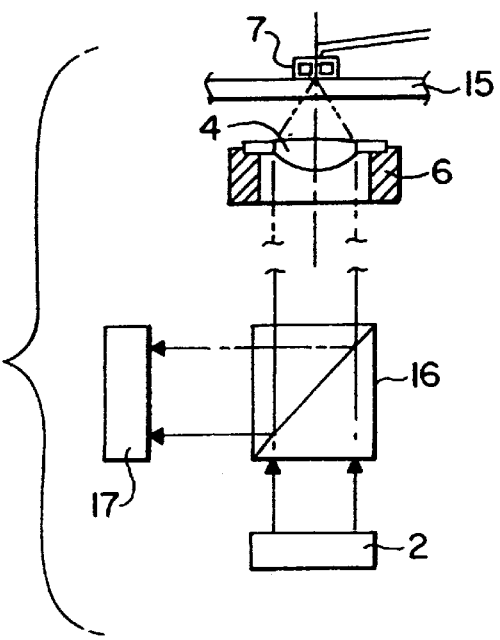
Figure 3A:
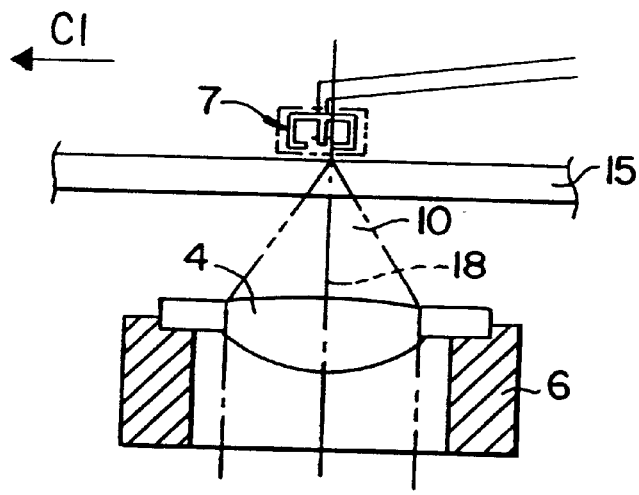
FIGS. 3(A), 3(B) and 3(C) are diagrams for explaining the operation of the conventional position adjustment method.
Figure 3B:
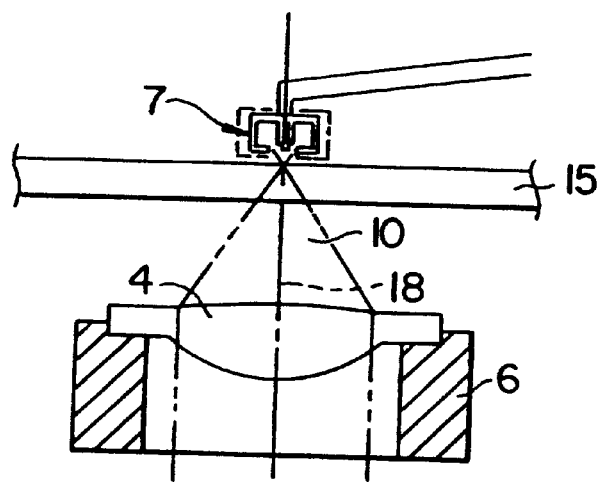
Figure 3C:
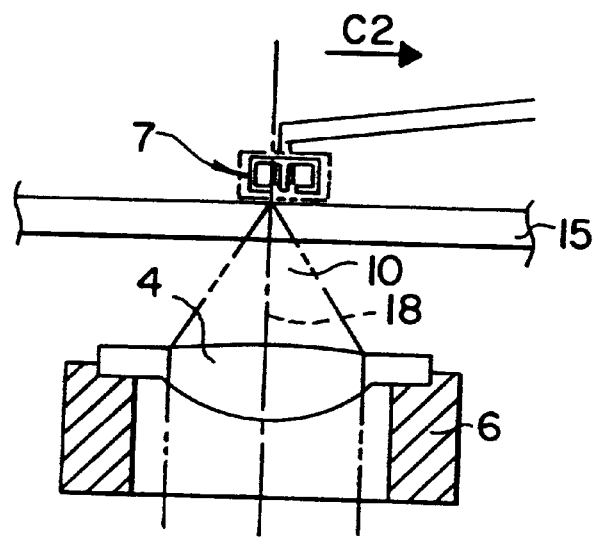
Figure 4:
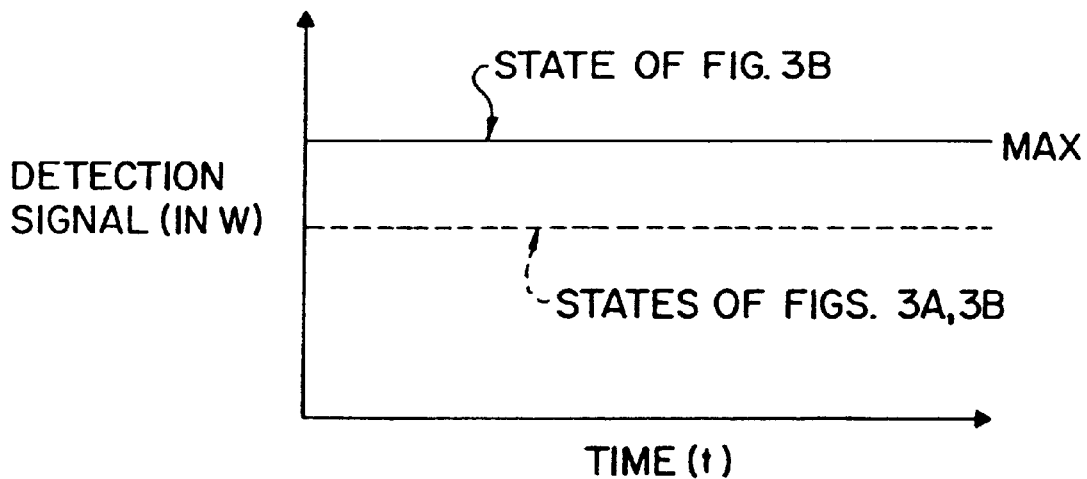
FIG. 4 is a diagram showing the relation between the amount of light reflected and the misalignments of the axis 18 of the light beam 10 and the center magnetic pole 13 of the magnetic head 7, in a conventional position adjustment method.
Figure 5:
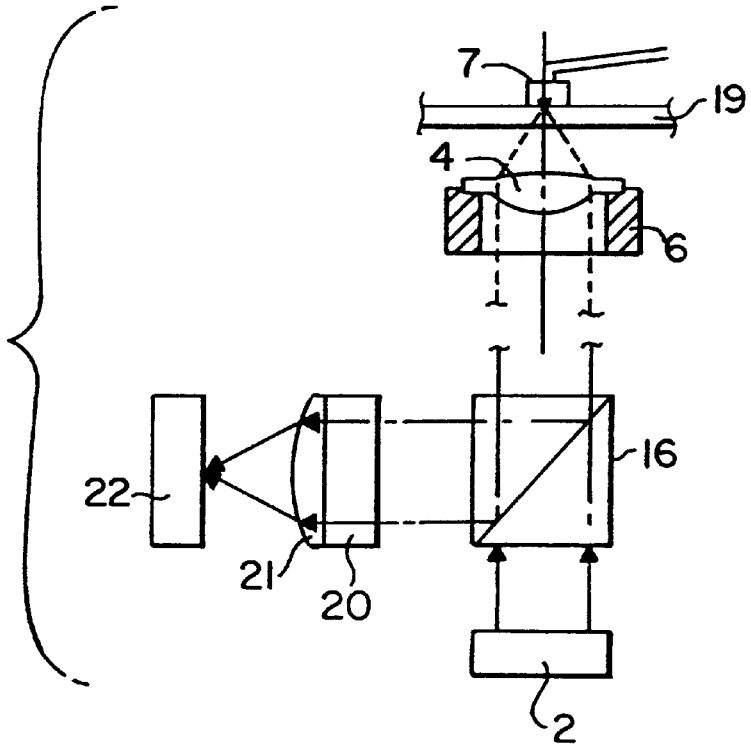
FIG. 5 is a diagram for explaining the operation of another conventional position adjustment method.
Figure 6A:
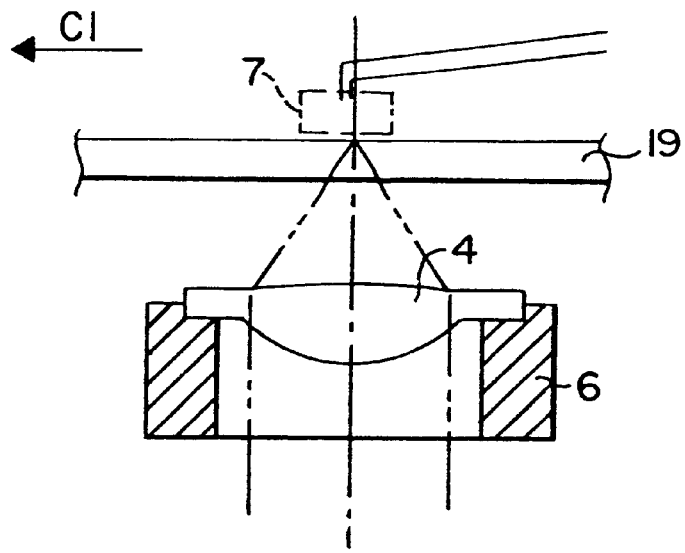
FIGS. 6(A), 6(B) and 6(C) are diagrams showing a third conventional position adjustment method.
Figure 6B:
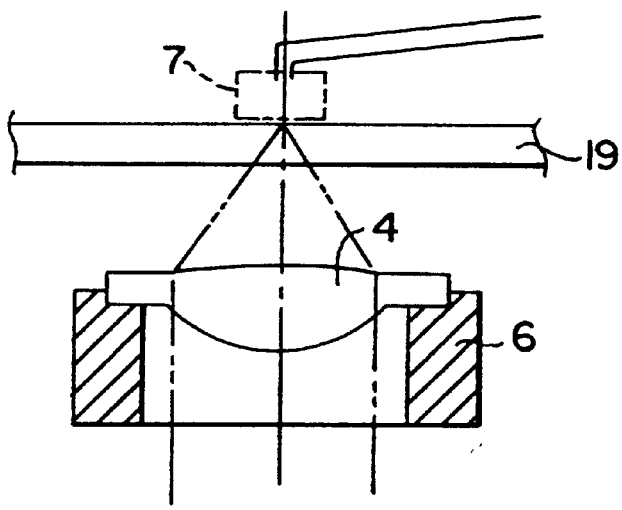
Figure 6C:
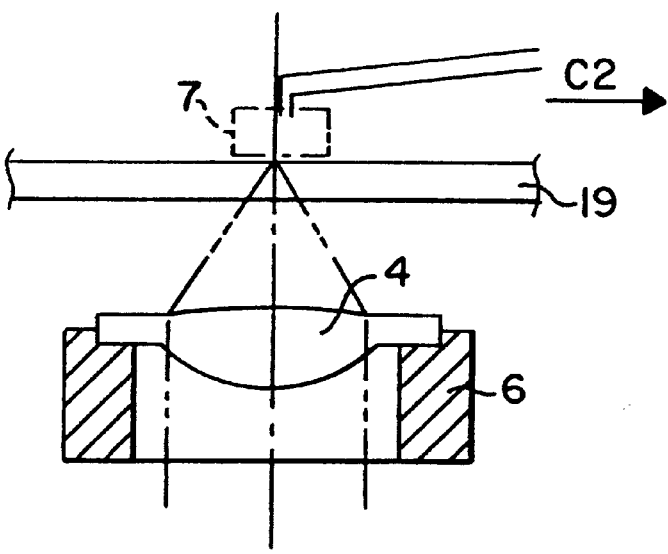
Figure 7:
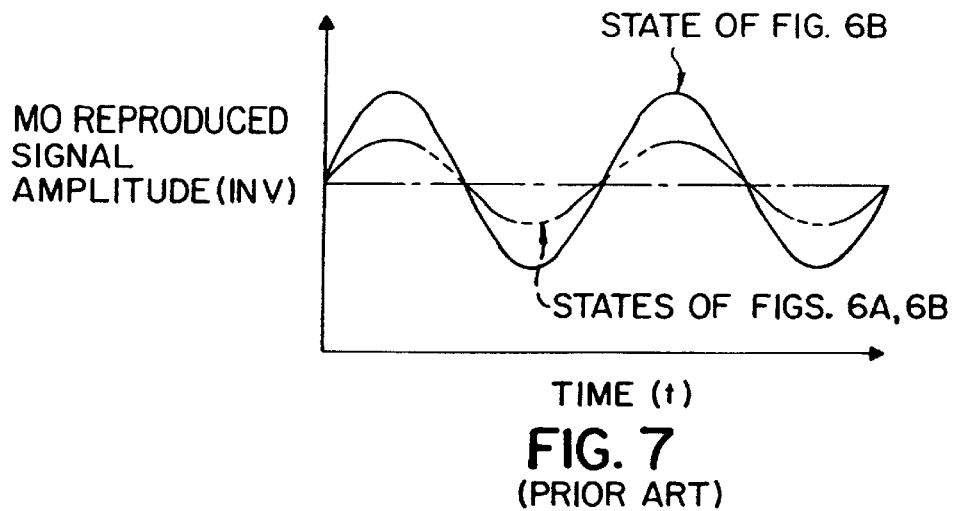
FIG. 7 is a diagram showing the relation between the amount of light reflected and the misalignments of the axis 18 of the light beam 10 and the center magnetic pole 13 of the magnetic head 7, in a third conventional position adjustment method.

Accordingly, by moving the magnetic head 7 within a desired magnetic field with respect to the light spot 10, that is, by aligning the magnetic head with the light spot 10, and, further, by detecting the position at which the reproduced signal amplitude detected at the photodetector 22 shown in FIG. 5 is at a maximum, it is possible to ascertain clearly the center of intensity of the magnetic field of the magnetic head 7.

Additionally, as will be explained below, detection sensitivity can be improved by providing a magnetized body opposite the light beam so as to emphasize the center peak of the magnetic field intensity distribution.

Figure 11:
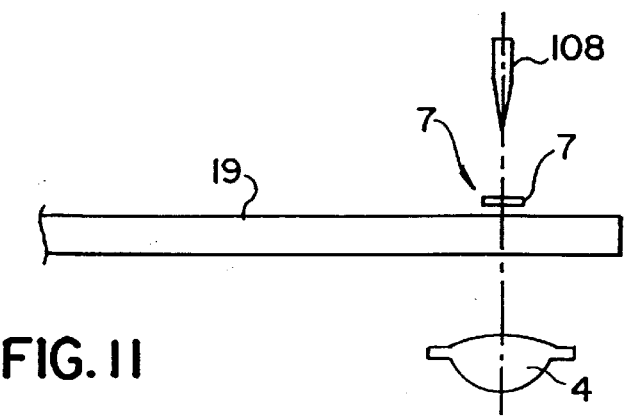
FIG. 11 is a structural diagram of an essential part of the present embodiment when a magnetized body is mounted on the adjustment assembly.

FIG. 11 is a structural diagram of an essential part of the present embodiment when a magnetized body is mounted on the adjustment assembly. A magnetized body 108 is fixedly mounted on the adjustment assembly so that a tip portion of the magnetized body 108 is positioned at what should be the center of the magnetic field intensity generated at the magnetic head 7, that is, the center of the light beam.

It should be noted that the magnetic flux is concentrated at the magnetized body 108 in response to the intensity of the magnetic field, so the stronger the magnetic field intensity the greater the magnetic flux concentration. Accordingly, it is possible to amplify differences in intensity of the magnetic field and, as a result, the effects of changes in the intensity of the magnetic field can be largely reflected in the reproduced signal.

Figure 12:
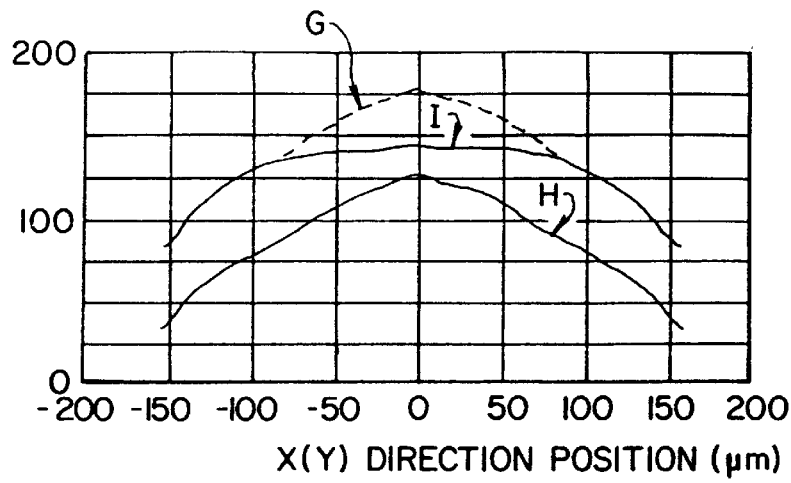
FIG. 12 is a diagram showing the distribution of the external magnetic field intensity in response to the position of the magnetic head when a magnetized body is provided.

FIG. 12 is a diagram showing the distribution of the external magnetic field intensity in response to the position of the magnetic head when a magnetized body is provided. As shown in FIG. 12, by providing the magnetized body 108 as described above, the external magnetic field intensity peaks opposite the light spot at what should be the center of the magnetic field intensity, with the intensity of the magnetic field decreasing relatively rapidly away from the center.

Figure 13A:
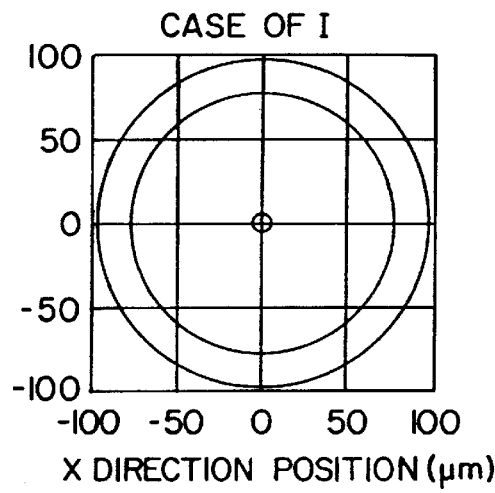
FIGS. 13(A) and 13(B) are contour-line maps of the distribution of the magnetic field intensity.
Figure 13B:
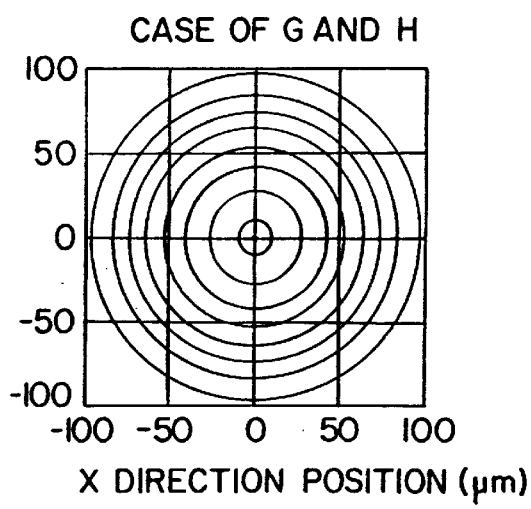

FIG. 13(A) and FIG. 13(B) are contour-line maps of the distribution of the magnetic field intensity. FIG. 13(A) shows magnetic field intensity distribution I and FIG. 13(B) shows magnetic field intensity distributions G, H.

As shown in FIG. 13(A), the magnetic field intensity distribution I obtained when a magnetized body is not provided indicates a relatively low degree of density of contour lines, that is, there is little change in the intensity of the magnetic field from position to position, and thus it is difficult to ascertain clearly the position of peak intensity of the magnetic field.

By contrast, as shown in FIG. 13(B), the magnetic field intensity distributions G, H obtained when a magnetized body is provided indicate a relatively high degree of density of contour lines, that is, there is much change in the intensity of the magnetic field from position to position, and thus it is easy to ascertain clearly the position of peak intensity of the magnetic field.

As described above, by providing a magnetized body opposite the light beam the peak value of the external magnetic field can be easily distinguished and, accordingly, the center of the external magnetic field can be clearly and easily ascertained.

It should be noted that the tip portion of the magnetized body 108 is tapered. As a result, the magnetic flux concentrates at the tip of the magnetized body 108 and can be concentrated on the light beam and, therefore, changes in the intensity of the magnetic field can be amplified.

Additionally, although in the present embodiment a magnetized body 108 is used to emphasize the distribution of the intensity of the magnetic field, an adjustment coil other than the magnetic head coil normally used for recording and reproducing may be provided instead of the magnetized body.

Figure 14A:
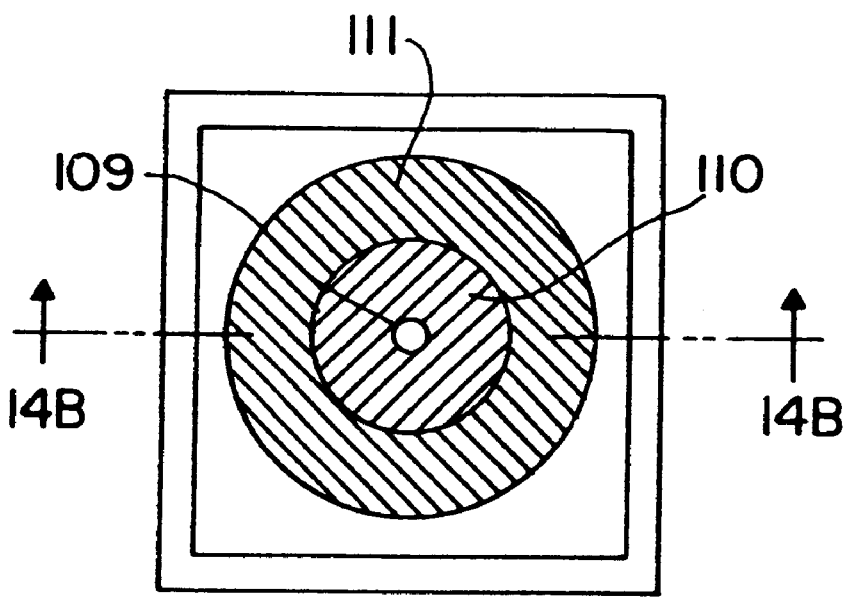
FIGS. 14(A) and 14(B) are structural diagrams of variations of the magnetic head of the present invention.
Figure 14B:
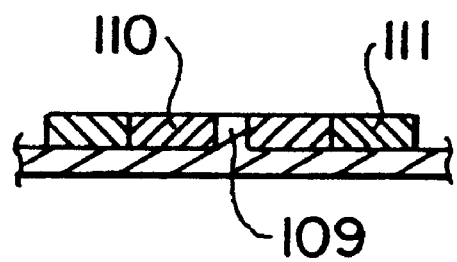

FIGS. 14(A) and 14(B) are structural diagrams of variations of the magnetic head of the present invention. FIG. 14(A) is a top view and FIG. 14(B) is a cross-sectional view along the line A—A in FIG. 14(A).

The magnetic head 7 comprises a yoke 109, a first coil 110 and a second coil 111. The yoke 109 is positioned at the center of the magnetic head 7. The first coil 110 is wound around the periphery of the yoke 109. The second coil 111 is wound around the periphery of the first coil 110. The second coil 111 is supplied with an electric current during normal recording and reproducing and supplies an external magnetic field to the magneto-optical disk 19. The first coil 110 is supplied with an electric current when aligning the center of the magnetic field generated at the magnetic head with the light beam.

It should be noted that it is only the first coil 110 that is supplied with an electric current during the alignment described above. By supplying only the first coil 110 with an electric current, a magnetic field is concentrated and generated at only a center portion of the magnetic head 7. As a result, a magnetic field having a distribution like that shown in FIG. 12 as magnetic field distribution H can be generated from the first coil 110.

Additionally, it should be noted that it is only the second coil 111 that is supplied with electric current during normal recording and reproducing. By supplying only the second coil 111 with an electric current, a magnetic field having a flat distribution like that shown in FIG. 12 as magnetic field distribution I can be generated, with a magnetic field applied over a broad range for accurate recording and reproducing.

Further, it should be noted that, by providing the first coil 110 on the magnetic head, it becomes unnecessary to align the light beam with the magnetized body.

A description will now be given of a method of mounting the magnetic head 7, with reference to FIG. 15 and FIG. 16.

Figure 15:
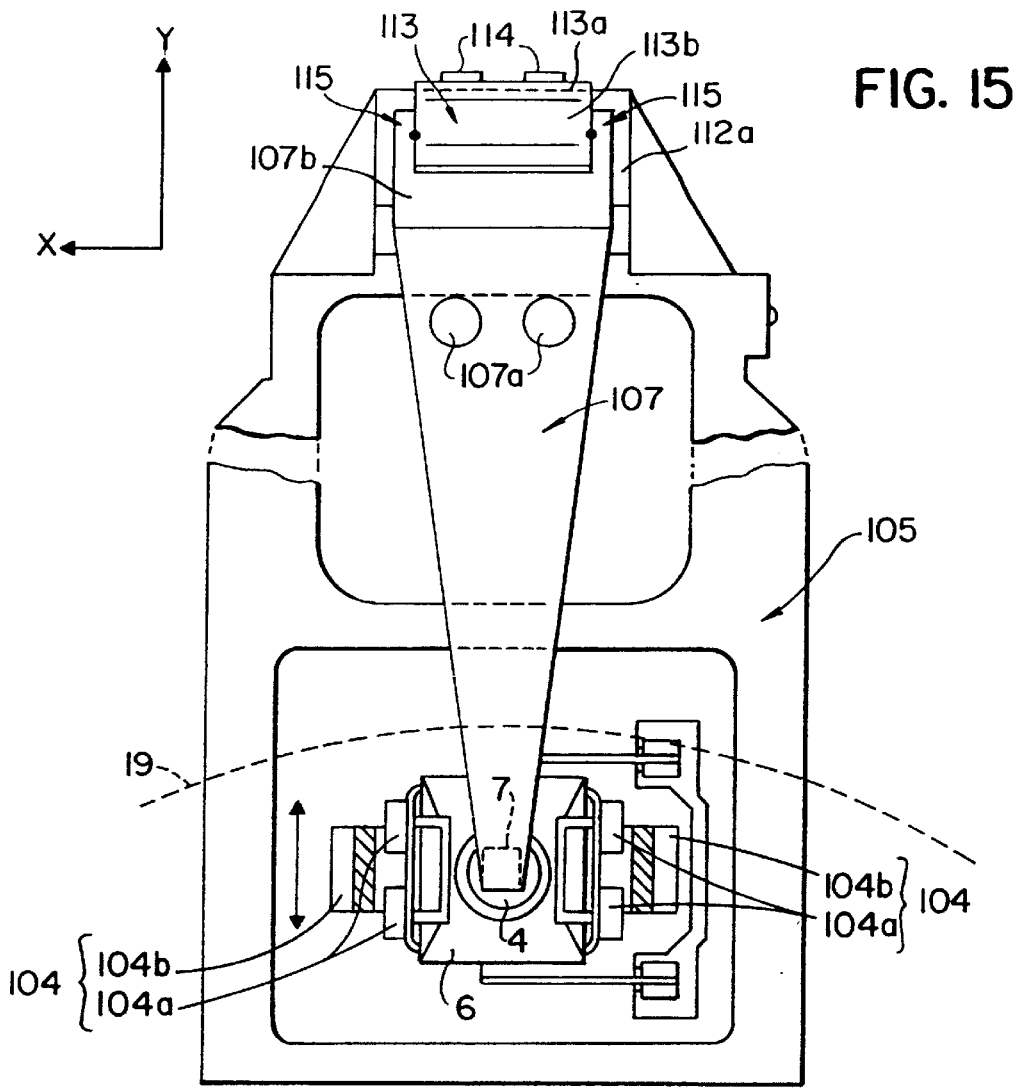
FIG. 15 is a top view of a fixing portion of the magnetic head of the present embodiment.
Figure 16:
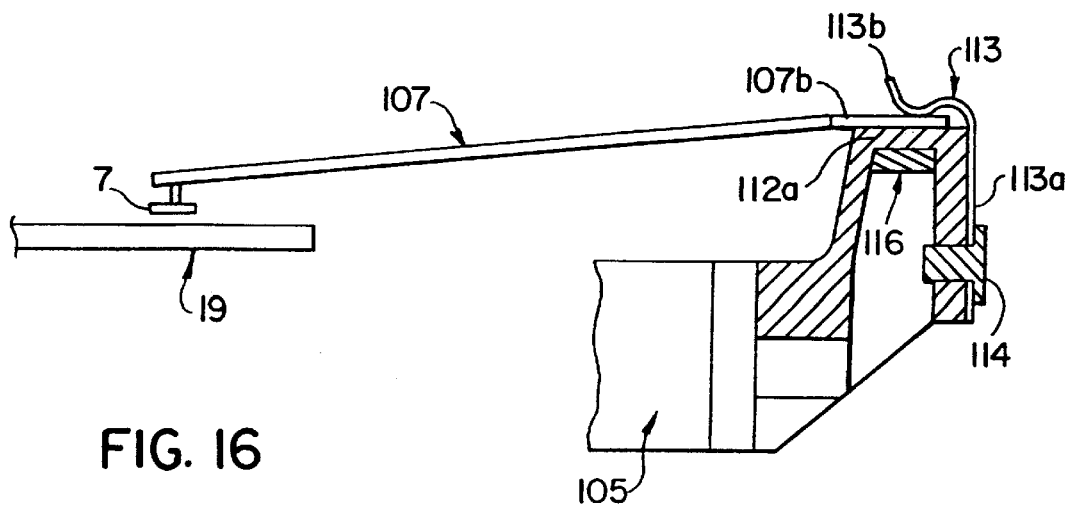
FIG. 16 is a cross-sectional view of a fixing portion of the magnetic head of the present embodiment.

FIG. 15 is a top view of a fixing portion of the magnetic head of the present embodiment and FIG. 16 is a cross-sectional view of a fixing portion of the magnetic head of the present embodiment.

The magnetic head 7 is fixedly mounted on a tip portion of the suspension arm 107, the suspension arm 107 comprising a leaf spring and elastically supporting the magnetic head 7 so that the magnetic head 7 is movable in a direction perpendicular to the recording surface of the magneto-optical disk 19. The remaining end of the suspension arm 107 is supported by the carriage 105.

Prior to adjustment, the suspension arm 107 is supported by the carriage 105, with the leaf spring 113 elastically pressing the suspension arm 107 against the carriage 105. The leaf spring 113 is bent in the shape of an L and comprises a fixing portion 113a and a supporting portion 113b.

A surface of a bottom area of the L comprises the fixing portion 113a, this fixing portion 113a being fixedly mounted to a side surface of the carriage 105 by screws 114. The long side of the L comprises the supporting portion 113b, which presses down on an upper surface of the carriage 105.

Adjustment is carried out in a state in which the suspension 107 is supported by the carriage 105 through the leaf spring 113 alone, that is, with the suspension arm 107 movable in a direction parallel to the recording surface of the magneto-optical disk 19.

Two seating holes 107a are provided on the suspension arm 107. An adjustment assembly movement arm is fitted into these two seating holes 107a. The adjustment assembly is moved by moving the suspension arm 107 by moving the movement arm. While the suspension arm 107 is being moved data is being played back from the magneto-optical disk 19 and a magnetic field intensity distribution like that shown in FIG. 12 is sought.

It should be noted that the output level of the reproduced signal of the magneto-optical disk 19 depends on the external magnetic field intensity. Accordingly, it is possible to detect the external magnetic field intensity by detecting the reproduced signal level.

The adjustment assembly moves the suspension arm 107 to a position of maximum magnetic field intensity within a magnetic field intensity distribution like that shown in FIG. 12.

By adjusting the suspension arm 107 as described above, the suspension arm 107 is positioned at an optimum position with respect to the carriage 105. Once the suspension arm 107 has been positioned with respect to the carriage 105, the suspension arm 107 is attached to the leaf spring 113 by an adhesive agent 115, thus fixedly mounting the suspension arm 107 on the carriage 105.

A description will now be given of a method of supporting the suspension arm 107 on the carriage 105 prior to adjustment.

A permanent magnet 116 is fixedly mounted inside a supporting portion 112a of the carriage 105 for supporting the suspension arm 107. Before the leaf spring 113 is fixedly mounted on the carriage 105 by the screws 114, the remaining end 107b of the suspension arm 107 is suctionally attached to the supporting portion 112a of the carriage 105 by the permanent magnet 116.

Next, the supporting portion 113a of the leaf spring 113 is fixedly mounted on the carriage 105 by the screws 114 in such a way that the supporting portion 113b of the leaf spring 113 presses on the upper surface of the remaining end 107b of the suspension arm 107 so that the suspension arm 107 is mounted on the supporting portion 112a of the carriage 105, by which supporting portion 112a the remaining end 107b of the suspension arm 107 is supported.

By providing a permanent magnet 116 inside a supporting portion 112a of the carriage 105 as described above, the suspension arm 107 can be supported easily and, as a result, the need to otherwise press and hold the suspension arm 107 in place while fastening the leaf spring 113 to the carriage can be eliminated, thereby making assembly easier. Additionally, the suspension arm 107 is fixedly mounted on the carriage 105 by adhesively attaching the suspension arm 107 to the leaf spring 113 by using an adhesive agent 115. Accordingly, no unnecessary force such as that generated by the tightening of screws is transmitted to the suspension arm 107 and, as a result, there is no concern that the suspension arm 107 will slip out of position.

It should be noted that after the magnetic head 7 has been positioned so as to align the center of the magnetic field generated at the magnetic head 7 with the light beam focused on the magneto-optical disk 19 from the light pick-up 103 and assembly of the magneto-optical disk device as an apparatus has been completed, and an electric current is supplied to the magnetic head 7 so as to generate a magnetic field intensity such that the rate of change in the reproduced signal amplitude becomes large, and a reproduced signal is obtained and its amplitude detected, a DC portion of a drive signal supplied to the actuator arm 104 of the light pick-up 103 may be set so as to maximize the reproduced signal. As a result, by setting the DC portion of the drive signal supplied to the actuator arm 104 of the light pick-up 103 so as to maximize the reproduced signal after assembly of the device has been completed, the magnetic head 7 can be adjusted easily even when slight misalignments of the magnetic head occur.

Additionally, it should be noted that although the present embodiment has been described by reference to a magneto-optical disk device, said method and device can also be applied to any assembly requiring positional adjustment, that is, alignment, of an external magnetic field and a light beam, for example positional adjustment of an external magnetic field and light beam of a device for recording and playing back magneto-optical cards.

According to the present invention, by setting the magnetic field intensity so that the rate of change in the amplitude of a reproduced signal played back when adjusting and aligning the positions of the light beam and the magnetic field as described above, the center of the magnetic field can be accurately aligned with the maximum value of the reproduced signal amplitude.

Additionally, according to the present invention, by concentrating an external magnetic field at the center of the magnetic field intensity distribution when adjusting and aligning the positions of the light beam and the magnetic field, the magnetic field intensity can be maximized at the center of the magnetic field and thus the center of the magnetic field can be ascertained with certainty.

Further, according to the present invention, by pressing the arm of the magnetic head onto the supporting member of the head carriage using a pressing member, the position of the magnetic head, once adjusted, can be fixedly maintained in place by fixedly mounting the pressing member on the carriage supporting portion.

Additionally, according to the present invention, after suctionally attaching the arm to the supporting portion by using a suction unit and by pressing the arm onto the supporting portion and supporting the arm thereby, the pressing member can be fixedly mounted on the supporting portion in a state in which the arm is suctionally attached to the supporting member.

Further, according to the present invention, by adjusting a light beam fine adjustment unit so that the center of the magnetic field applied to the recording medium from the magnetic field application unit and the center of the light focused on the recording medium by the light focusing unit are in alignment after adjusting the relative positions of the magnetic field application unit and the light focusing unit, the relative positions of the magnetic field and the light beam can be accurately adjusted.

The above description is provided in order to enable any person skilled in the art to make and use the invention and sets forth the best mode contemplated by the inventors of carrying out their invention.

The present invention is not limited to the specifically disclosed embodiment and variations, and modifications may be made without departing from the scope of the present invention.

The present application is based on Japanese priority application No. 10-234699 filed on Aug. 20, 1998, the entire contents of which are hereby incorporated by reference.

What is claimed is:

1. A magneto-optical device comprising:
   an optical directing unit directing a light beam onto a position on a recording medium;
   a magnetic field generating unit applying a magnetic field to the recording medium at the position onto which the light beam is directed, the magnetic field having a magnetic field intensity within a predetermined range below a saturation magnetic field intensity of the recording medium; and
   an adjustment unit adjusting the magnetic field intensity to obtain a desired rate of change of a reproduced signal amplitude with respect to the magnetic field intensity.

2. The magneto-optical device as claimed in claim 1, wherein the adjustment unit adjusts the magnetic field intensity by varying an electric current supplied to the magnetic field generating unit.

3. The magneto-optical device as claimed in claim 1, wherein the adjustment unit adjusts the magnetic field intensity by varying a distance between the magnetic field generating unit and the recording medium.

4. The magneto-optical device as claimed in claim 1, wherein the adjustment unit adjusts the magnetic field intensity by varying the relative positions of the magnetic field generating unit and the optical directing unit.

5. The magneto-optical device as claimed in claim 1, wherein the adjustment unit comprises a magnetized body opposite the optical directing unit across the recording medium.

6. The magneto-optical device as claimed in claim 1, further comprising a magnetized body opposite the optical directing unit across the recording medium.

7. The magneto-optical device as claimed in claim 4, further comprising a magnetized body opposite the optical directing unit across the recording medium.

8. A magneto-optical device comprising:

an optical directing unit directing a light beam onto a position on a recording medium; and magnetic field generating unit applying a magnetic field to the recording medium at the position onto which the light beam is directed, the magnetic field having a magnetic field intensity that lies within a predetermined range below a saturation magnetic field intensity of the recording medium and that exhibits a desired rate of change with respect to the amplitude of the reproduced signal.

9. The magneto-optical device as claimed in claim 8, further comprising a magnetized body opposite the optical directing unit across the recording medium.

10. A method of reproducing a signal stored on a magneto-optical recording medium, the reproduced signal having an amplitude, the medium having a saturation magnetic field intensity, the method comprising the steps of:

projecting a light beam generated by a first unit onto a position on the recording medium;

applying a magnetic field generated by a second unit to the recording medium at the position onto which the light beam is projected, the magnetic field having a magnetic field intensity within a predetermined range below the saturation magnetic field intensity; and adjusting the magnetic field intensity to obtain a desired rate of change of the reproduced signal amplitude with respect to the magnetic field intensity.

11. The method as claimed in claim 10, wherein the magnetic field intensity is adjusted by varying an electric current supplied to the second unit.

12. The method as claimed in claim 10, wherein the magnetic field intensity is adjusted by varying a distance between the recording medium and the second unit.

13. The method as claimed in claim 10, wherein the magnetic field intensity is adjusted by varying the relative positions of the first unit and the second unit.

14. The method as claimed in claim 10, wherein the magnetic field intensity is adjusted by positioning a magnetized body opposite the first unit across the recording medium.

15. The method as claimed in claim 11, further comprising the step of varying the relative positions of the first unit and the second unit to maximize the reproduced signal amplitude.

16. The method as claimed in claim 12, further comprising the step of varying the relative positions of the first unit and the second unit to maximize the reproduced signal amplitude.

17. The magneto-optical memory device as claimed in claim 8, further comprising an adjustment unit provided at a position corresponding to a center of the magnetic field generated by the magnetic field generating unit and that generates a magnetic field that adjusts the magnetic field intensity of the magnetic field generated by the magnetic field generating unit.

* * * * *

UNITED STATES PATENT AND TRADEMARK OFFICE
CERTIFICATE OF CORRECTION

PATENT NO.     : 6,185,162 B1
DATED          : February 6, 2001
INVENTOR(S)    : Kunimatsu et al.

It is certified that error appears in the above-identified patent and that said Letters Patent is hereby corrected as shown below:

<u>Title page,</u>
Item [56], References Cited, FOREIGN PATENT DOCUMENTS,
Delete "5-168615" and insert -- 5-128615 -- therefor.

Signed and Sealed this

Twenty-second Day of April, 2003

JAMES E. ROGAN
*Director of the United States Patent and Trademark Office*